Figure 1:
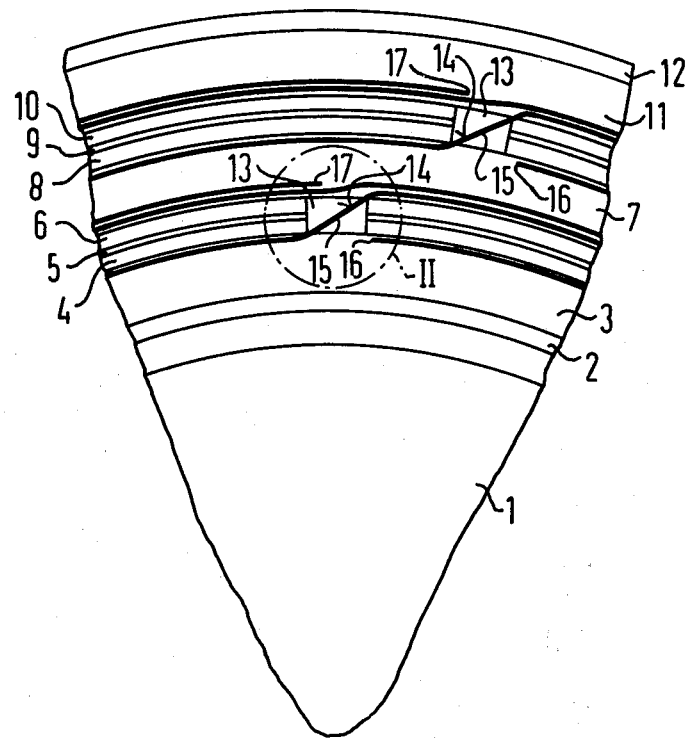

United States Patent [19]

Kessler

[11] 4,403,270

[45] Sep. 6, 1983

[54] LAYER CAPACITORS AND METHOD FOR THE MANUFACTURE THEREOF

[75] Inventor: Hartmut Kessler, Regensburg, Fed. Rep. of Germany

[73] Assignee: Siemens Aktiengesellschaft, Berlin and Munich, Fed. Rep. of Germany

[21] Appl. No.: 254,194

[22] Filed: Apr. 14, 1981

[30] Foreign Application Priority Data

Apr. 23, 1980 [DE] Fed. Rep. of Germany ....... 3015678

[51] Int. Cl.³ .......................... H01G 4/18; H01G 4/30
[52] U.S. Cl. ................................... 361/328; 29/25.42; 242/56.1; 361/323
[58] Field of Search ...................... 29/25.42; 242/56.1; 361/309, 323, 324, 328, 329

[56] References Cited

U.S. PATENT DOCUMENTS 3,728,765  4/1973  Behn et al. ........................ 29/25.42

FOREIGN PATENT DOCUMENTS 2424368  5/1974  Fed. Rep. of Germany .

*Primary Examiner*—Carl E. Hall
*Attorney, Agent, or Firm*—Herbert L. Lerner; Laurence A. Greenberg

[57] ABSTRACT

Method for the manufacture of layer capacitors, which includes winding a plurality of mother capacitors wound from at least one capacitor foil on a drum on top of each other, winding a turn of a cover foil packet formed of cover foils and a separating foil on each mother capacitor and having a gap between the beginning and the end of the turn of the cover foil packet, winding value foils through the gap and toward the mother capacitor on top of the gap, winding a holding foil with increased winding tension into at least the last wound value foil layer to place the cover foil packet under the holding foil with a shift in phase, continuing to wind the holding foil with the value foil through the gap for more than one turn, and cutting off the holding foil.

9 Claims, 2 Drawing Figures

U.S. Patent Sep. 6, 1983 4,403,270

LAYER CAPACITORS AND METHOD FOR THE MANUFACTURE THEREOF

The present invention relates to a method for the manufacture of layer capacitors, in which several mother capacitors wound of one or several capacitor foils are placed successively on a drum of large diameter, in which a turn of a cover foil packet is wound on each mother capacitor, and in which a small space remains between the beginning and the end of the turn of the cover foil packet, where the "value" foil is brought through this space and continued to be wound toward the mother capacitor disposed on top thereof.

Such a method is known from German Patent DE-PS No. 24 24 368. In that publication, starting capacitor is produced by winding several mother capacitors on top of each other in the manner described; the end faces are completely flame sprayed or "Schooped" according to the Schoop method. Separating foils are contained in the cover foil packet. After the starting capacitor is completely "Schooped", the separating foils allow the capacitor to be separated into the mother capacitors. These separating foils extend, for instance, beyond the value foils and cover foils, and protrude beyond the sprayed on Schooping layers. It is therefore possible to separate the starting capacitor along the separating foils without difficulty, particularly if at least one radial cut is made through the starting capacitor. The mother capacitors are subsequently sawed into individual capacitors.

The so-called value foils are those foils which determine the capacity value of the capacitor. They contain at least one metallization but can also contain several metallizations and/or layers of plastic. The cover foil packet must always contain the cover foils necessary for each mother capacitor disposed above and below, and the separating foil. As a result, the cover foil packet is substantially thicker and stiffer than the value foils, which are wound to form the capacitively active part of the capacitor.

The value foils slide or creep sideways, over and with the cover foil packet especially if particularly thin value foils are used; mother windings with a cross section that is not rectangular are thus produced.

It is accordingly an object of the invention to provide layer capacitors and a method of manufacture thereof, which overcomes the hereinafore-mentioned disadvantages of the heretofore-known devices and methods of this general type, and to prevent lateral slide or creeping of the value foils in a method of the above-described type even if particularly thin value foils are used.

With the foregoing and other objects in view there is provided, in accordance with the invention, a method for the manufacture of layer capacitors, which comprises winding a plurality of mother capacitors wound from at least one capacitor foil on a drum of large diameter on top of each other, winding a turn of a cover foil packet formed of cover foils and a separating foil on each mother capacitor and leaving a small gap between the beginning and the end of the turn of the cover foil packet, winding value foils through the gap and toward the mother capacitor on top of the gap, winding-in or introducing a holding foil with increased winding tension into at least the last wound value foil layer to place or introduce the cover foil packet under the holding foil with a circumferential displacement or shift in phase*, continuing to wind the holding foil with the value foil through the gap for more than one turn and cutting off the holding foil.

*"shift in phase" means an angle in circumferential direction between the beginning of the holding foil, the centre of the drum and the beginning of the cover foil packet.

This solution of the problem is based on our discovery that the lateral slide or creeping of the value foils is caused by the stiffness of the cover foil packet. For this reason, the cover foil packet tends to lie on the substrate only at certain points, in the form of an arched bridge so-to-speak. Upon further winding of the value foils, the pressure on the cover foil packet underneath is continuously increased; the cover foil packet is pressed harder and harder on the mother capacitor underneath and tries to give way laterally at the points of the arch taking along the already wound value foils, so that the winding is shifted to the side. Only when the cover foil packet is completely pressed on, i.e. possibly only after 1 to 2 mm of winding height of the value foil, this process is completed and the rest of the winding exhibits no further lateral sliding or creeping.

Wound-in holding foils increase the tensile strength of the value foils. This makes it possible to use increased winding tension. The increased tension presses the cover foil packet so strongly onto the mother winding underneath from the start, that the cover foil packet no longer gives way to the side later on.

The increased winding tension is made possible by the friction of the holding foil on the winding underneath, without unduly stressing in tension the value foil above.

If the thickness of the value foils is, for instance 5 $\mu m$, and the thickness of the cover foil packet about 1 mm, it is sufficient to wind-in a holding foil 50 $\mu m$ thick.

In accordance with another mode of the invention, to produce a friction force for the necessary tensile stress which is sufficient, there is provided a method which includes winding-in the holding foil at least one turn sooner than the cover foil packet and in accordance with a further mode of the invention, there is provided a method which includes cutting off the holding foil at least one turn after crossing the gap. This crossing takes place after the holding foil has formed a full turn on the cover foil packet.

In accordance with an added mode of the invention, there is provided a method which includes pressing the wound foils on the winding with a pressure roll, subjecting the foils to a winding tension, and increasing the pressure of the pressure roll and the winding tension of the holding foil after the holding foil is wound or introduced. The pressure of the pressure roll is increased if the difference between the thickness of the value foils and the holding foil after the holding foil is introduced is large.

In accordance with an additional mode of the invention, there is provided a method which includes increasing the winding tension as the wound-in length of the holding foil is increased until the cover foil packet is wound or introduced. By this measure, the winding tension is not increased beyond the magnitude permissible for the value foils in any phase. At the same time the attainable friction force is utilized optimally. The winding tension can be changed continuously or in steps.

A sufficient winding tension is obtained if the cover foil packet is in form-locking contact with the mother capacitor underneath over the entire circumference thereof. In other words, the shape of the parts themselves locks them together.

In accordance with yet a further mode of the invention, there is provided a method which includes stamping capacitor data on the holding foil so that the data can be read through the cover foils after completion of the capacitor. The layers of the value foil between the layers of the holding foil are metallized and are therefore opaque and thus ensure that the lettering on the holding foil does not appear double or unclear. A particularly uniform distribution of the pressure is obtained even in the neighborhood of the ends of the cover foil packet, if in accordance with a concomitant mode of the invention, there is provided a method which includes winding or introducing the cover foil packet at a small distance ahead of the beginning of the holding foil after the beginning of the holding foil is wound and located at least one turn lower, and cutting off the holding foil over the gap after the necessary turns have been made. The holding foil which is already wound-in lies back one or more turn, i.e. lies deeper.

In accordance with the device of the invention, there is provided a layer capacitor, comprising a drum, a plurality of mother capacitors wound from at least one capacitor foil on the drum on top of each other, a cover foil packet being wound through a turn on each mother capacitor, the cover foil packet being formed of cover foils and a separating foil and having a beginning and an end spaced apart from each other defining a gap therebetween, value foils wound in layers through the gap toward the mother capacitor on top of the gap, and a holding foil wound with increased winding tension into at least the last wound value foil layer placing the cover foil packet under the holding foil with a shift in phase, the holding foil being wound with the value foil through the gap for more than one turn and being cut off.

In principle, any insulating foil can be used as a holding foil. Especially well suited are foils which have about the same shrinkage as the cover foil. They may be coated with adhesive on one or both sides or may be capable of being heat-sealed. The width can be equal to the width of the cover foils or in the case of cover foils wound on top of each other and staggered, it may be equal to the width of the cover foil packet.

Other features which are considered as characteristic for the invention are set forth in the appended claims.

Although the invention is illustrated and described herein as embodied in layer capacitors and method for the manufacture thereof, it is nevertheless not intended to be limited to the details shown, since various modifications and structural changes may be made therein without departing from the spirit of the invention and within the scope and range of equivalents of the claims.

Figure 2:
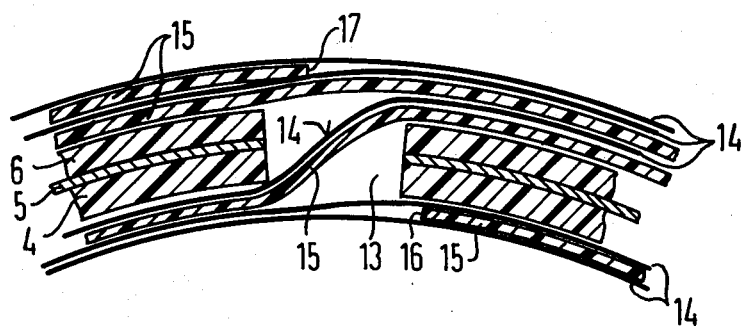

The construction and method of operation of the invention, however, together with additional objects and advantages thereof will be best understood from the following description of specific embodiments when read in connection with the accompanying drawings, in which:

FIG. 1 is a fragmentary diagrammatic elevational view of a starting capacitor; and FIG. 2 is an enlarged partly cross-sectional view of the area within the dot-dash circle II of FIG. 1, representing the beginning and the end of the cover foils, the separating foil and the holding foil.

Referring now to the figures of the drawing and first particularly to FIG. 1 thereof, there is seen a first cover layer 2 of insulating material foils wound on a drum 1 of large diameter as cover foils, a first layer 3 of value foils, a second cover layer 4, a first separating foil 5, a third cover layer 6, further layers 7 and 11 of value foils, cover layers 8 and 10, a further separating foil 9, and a cover layer 12. A pair of cover layers 4 and 6, and a pair 8 and 10, respectively, as well as a separating layer 5 and 9, respectively, disposed therebetween, each form a cover foil packet which is prefabricated and wound-in as a whole. A cover foil packet includes, for instance, 10 cover foils plus a separating foil plus 10 more cover foils, where the cover foils are 50 $\mu$m thick and the separating foil is 100 $\mu$m thick, i.e. the overall thickness of this cover foil packet is 1.1 mm.

As best seen in FIG. 2, under the last turn of a value foil 14, a holding foil 15 is wound-in. Under this holding foil, the cover foil packet which includes foils 4 to 6 and 8 to 10, is introduced and wound-in. The cover foil packet comprises somewhat less than one turn, so that between the beginning and the end of the cover foil packet is a gap 13, through which the holding foil 15 and the value foil run. The holding foil 15 forms a complete turn over the cover foil packet and an almost complete second turn. The holding foil is cut off above the gap 13.

The cover foil packet with the foil layers 4 to 6 and 8 to 10, respectively, is wound-in shortly before or over the beginning 16 of the holding foil 15 into the winding. The end 17 of the holding foil 15 lies over the gap 13. Therefore the beginning as well as the end of the cover foil packet is pushed particularly smoothly against the mother capacitor underneath, since the foil 15 passing through the gap 13 and over and under the packet compensates for the ends 16, 17. Through the use of the holding foil it is assured, even if thin value foils with a thickness of less than 5 $\mu$m are used, that lateral sliding or creeping of the value foils does not occur during the winding; that the winding remains stable on the drum; that no difficulties arise when the mother or parent capacitor is sawed apart and the leads are applied due to overhanging parts of the mother capacitor; that the dimensional accuracy is assured; and that the quality of the contact meets the requirements. The quality comes into question if due to lateral displacement of the foil, the Schoop metal no longer reaches the metallizations.

The holding foil can be introduced into the winding automatically in the conventional manner.

There is claimed:

1. Method for the manufacture of layer capacitors, which comprises winding a plurality of mother capacitors wound from at least one capacitor foil on a drum on top of each other, winding a turn of a cover foil packet formed of cover foils and a separating foil on each mother capacitor and having a gap between the beginning and the end of the turn of the cover foil packet, winding a value foil through the gap and toward the mother capacitor on top of the gap, winding a holding foil with increased winding tension into at least the last wound value foil layer to place the cover foil packet under the holding foil with circumferential displacement therebetween, continuing to wind the holding foil with the value foil through the gap for more than one turn, and cutting off the holding foil.

2. Method according to claim 1, which includes winding-in the holding foil at least one turn sooner than the cover foil packet.

3. Method according to claim 1, which includes cutting off the holding foil at least one turn after crossing the gap.

4. Method according to claim 1, which includes pressing the wound foils on the winding with a pressure roll, subjecting the foils to a winding tension, and increasing the pressure of the pressure roll and the winding tension of the holding foil after the holding foil is wound.

5. Method according to claim 4, which includes increasing the winding tension as the wound length of the holding foil is increased until the cover foil packet is wound.

6. Method according to claim 1, which includes continuously reducing the winding tension after the holding foil has crossed the gap until it reaches a given permissible value for the value foil when the holding foil is cut off.

7. Method according to claim 1, which includes stamping capacitor data on the holding foil so that the data can be read through the cover foils after completion of the capacitor.

8. Method according to claim 1, which includes winding the cover foil packet ahead of the beginning of the holding foil after the beginning of the holding foil is wound and located at least one turn lower, and cutting off the holding foil over the gap.

9. A layer capacitor, comprising a drum, a plurality of mother capacitors wound from at least one capacitor foil on said drum on top of each other, a cover foil packet being wound through a turn on each mother capacitor, said cover foil packet being formed of cover foils and a separating foil and having a beginning and an end spaced apart from each other defining a gap therebetween, a value foil wound through the gap toward said mother capacitor on top of the gap, and a holding foil wound with increased winding tension into at least the last wound value foil layer thereby placing said cover foil packet under said holding foil with a circumferential displacement therebetween, said holding foil being wound with said value foil through the gap for more than one turn and being cut off.

* * * * *